INVENTOR
WALTER B. HORNE

INVENTOR
WALTER B. HORNE 3,169,001
AIRCRAFT WHEEL SPRAY DRAG ALLEVIATOR
Walter B. Horne, Williamsburg, Va., assignor to the United States of America as represented by the Administrator of the National Aeronautics and Space Administration
Filed Dec. 2, 1963, Ser. No. 327,565
11 Claims. (Cl. 244—103)
(Granted under Title 35, U.S. Code (1952), sec. 266)

The invention described herein may be manufactured and used by or for the Government of the United States of America for governmental purposes without the payment of any royalties thereon or therefor.

This invention relates to a device for alleviating wheel spray drag, and more particularly to an arrangement for alleviating wheel spray drag on landing gear of the four-wheel bogie type.

Research has shown that take-off performance of four-engine jet transports and other aircraft equipped with dual-tandem wheel landing gears is drastically affected by the presence of a fluid cover such as slush or water on runways. Because of this loss in performance, the one-half inch rule is being enforced which prohibits operation of jet-turbine category commercial aircraft from operating on runways covered with slush or standing water exceeding one-half inch depth. Although prior art devices have been utilized to prevent fluid drag on the fuselage of amphibious aircraft, no prior art mechanism is known which will effectively reduce fluid drag on wheels of aircraft landing gear.

The wheel spray drag alleviator disclosed herein has proven in numerous tests that the fluid drag may be reduced as much as forty-four percent on a four-wheel bogie type landing gear. This is accomplished by deflector plates connected to the bogie landing gear in such manner that the front wheel fluid spray is prevented from impinging on the rear wheels of such landing gear, and thus results in a substantial reduction of fluid drag on the gear system.

It is therefore, an object of this invention to provide a wheel spray drag alleviator which will effectively reduce fluid drag generated by the landing gear wheels.

Another object of the invention is to provide a wheel spray drag alleviator which is adapted for use with dual-tandem wheel landing gears.

A further object of the invention is to provide a wheel spray drag alleviator which will allow aircraft to safely operate on a runway covered with slush or water exceeding one-half inch depth.

Still another object of the invention is to provide a wheel spray drag alleviator which will increase aircraft take-off acceleration and performance on runways covered with slush or standing water.

Yet another object of the invention is to provide a wheel spray drag alleviator which has a minimum effect on the aerodynamic characteristics of an aircraft.

Another object of the invention is to provide a wheel spray drag alleviator which is of simple design, economical to manufacture, easy to install and maintain, and reliable under adverse runway conditions.

An additional object of the invention is to provide an aircraft landing arrangement which will improve passenger safety.

Yet another object of the invention is to provide a spray drag alleviator which can be readily attached or detached as the weather and seasons control its necessity.

These and other objects and advantages of the invention will become more apparent upon reading the specification in conjunction with the accompanying drawings.

Figure 4:
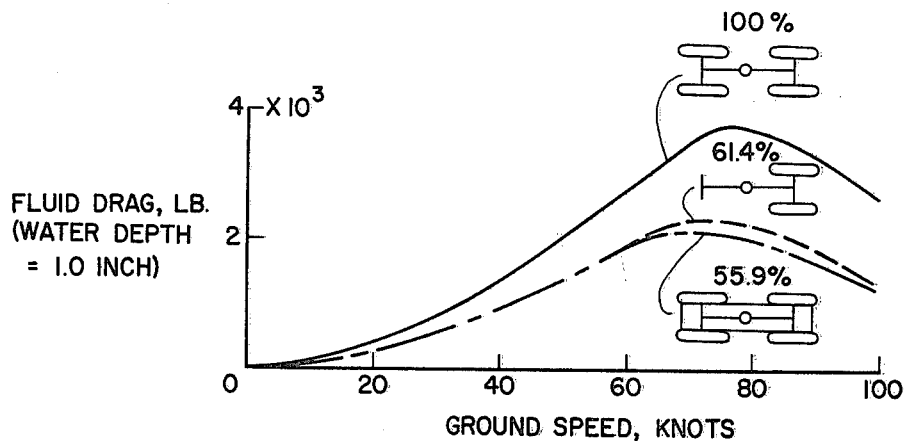
Figure 5:
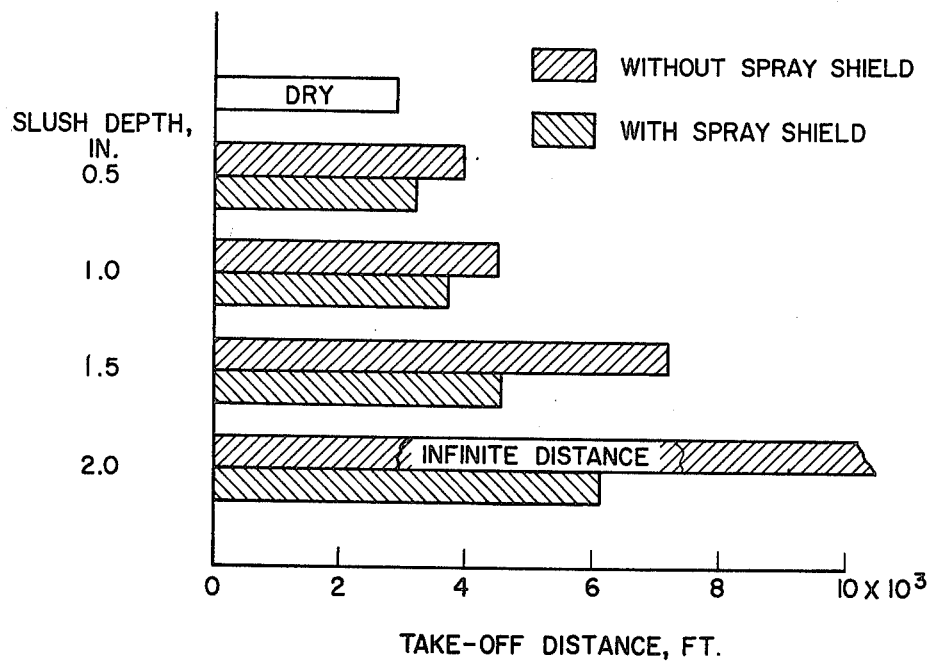

FIG. 4 is a graphic view showing fluid drag plotted against ground speed for dual front wheels and for a dual-tandem wheel bogie landing gear with and without the wheel spray drag alleviator of the present invention; and FIG. 5 is a graphic representation of the calculated runway take-off required for a jet transport in varying slush depths with and without the wheel spray drag alleviator of the present invention.

Basically, this invention relates to a wheel spray drag alleviator in the form of a deflector. The deflector has a generally T-shaped cross section, the crest or top portion of which is rigidly connected to the wheel support beam. The deflector is an elongated member extended from a position forward of the front wheels and beyond the rear wheels. The crest or deflection plate of the deflector functions to force the spray generated by the wheels downwardly and the dividing or separator plate directs the spray away from opposing wheels.

Figure 1:
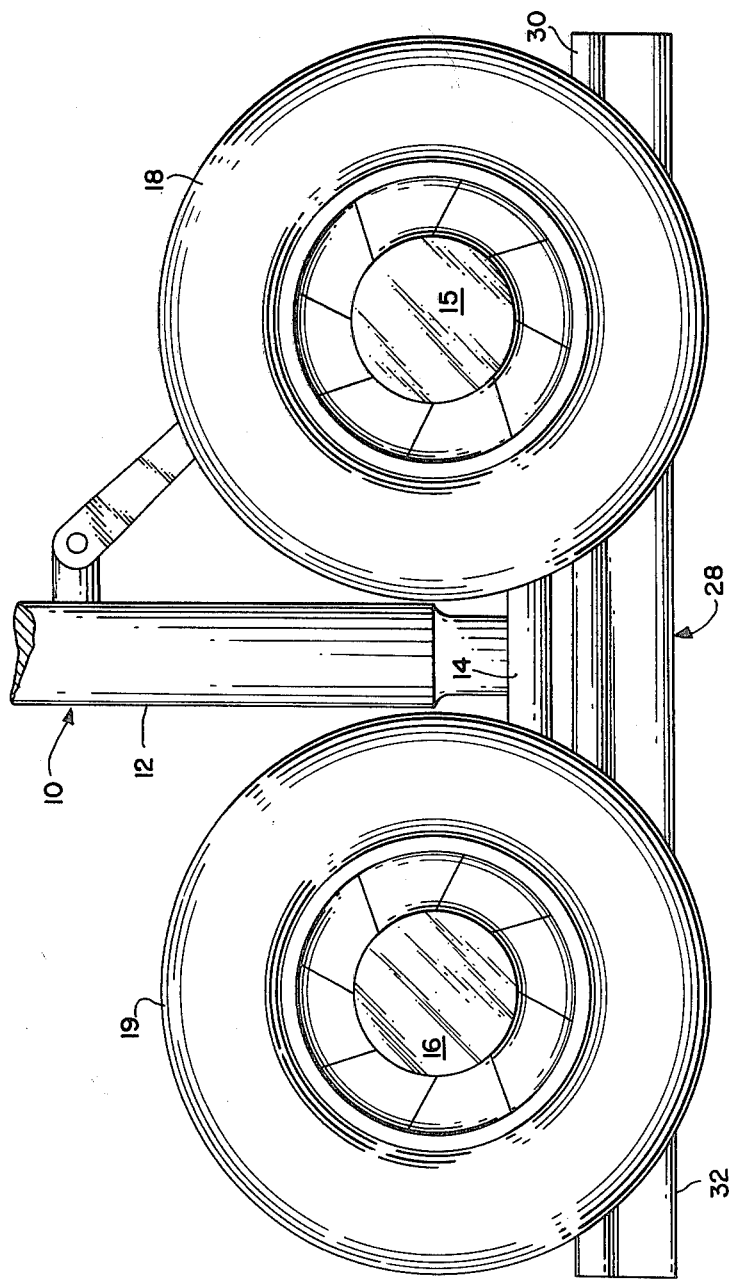
FIG. 1 is a side elevational view of a dual-tandem wheel bogie landing gear showing the wheel spray drag alleviator.

Referring now more specifically to the details of the invention, FIG. 1 shows a side elevational view of the landing gear bogie designated generally by the reference numeral 10.

The bogie 10 includes a main strut 12 which may be of a conventional tubular design. Fixed to the main strut 12 is a wheel support beam 14. The beam 14 is located in a plane substantially perpendicular to the main strut 12 and extends from either side thereof. Axles 15 and 16 are carried by the beam 14 forward and aft of the main strut 12 in a conventional manner. Wheels 18 and 21 are journaled on the axle 15 and wheels 19 and 20 on the axle 16. This is all conventional structure constituting a dual-tandem wheel bogie landing gear which might be found on a large jet aircraft or other air vehicles.

Connectors or brackets (FIG. 2) 24 and 26 are fixed to the bottom of the wheel support beam 14 in a well known manner such as by bolts or welding. The deflector 28 is in turn fixed to the bottom of the brackets 24 and 26 by a conventional fastening technique such as welding, riveting, or securing with bolts.

Figure 3:
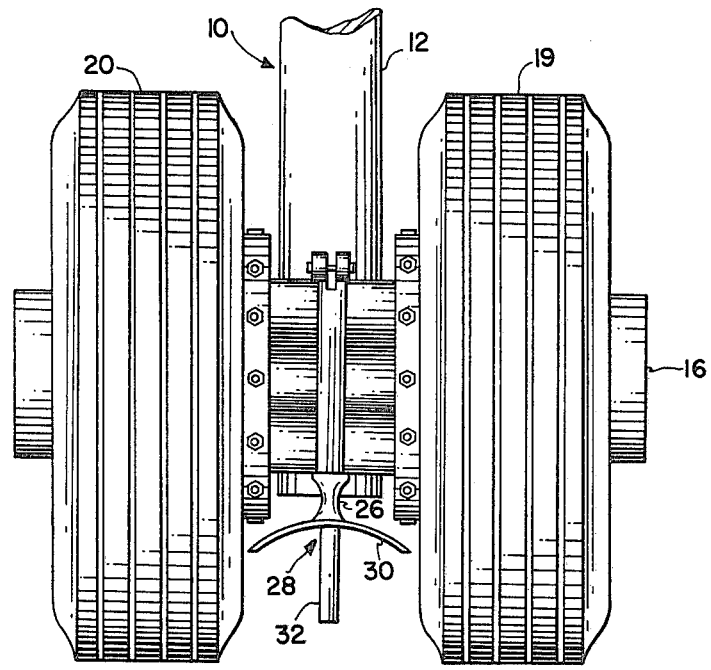
FIG. 3 is a rear elevational view of a dual-tandem wheel bogie landing gear showing the wheel spray drag alleviator.

The deflector 28 consists of a crescent-shaped crest or deflector plate 30 (FIG. 3) and a dividing or separating plate 32. The deflection plate and separator plate are of a length such that portions project forward of the front wheels 18 and 21 and beyond the rear wheels 19 and 20. The plates when joined together have a generally T-shaped cross section as illustrated in FIG. 3. The deflection plate 30 and separator plate 32 may be secured together by known techniques. The deflector plate may be constructed from various materials, but should have a rigidity sufficient to withstand the forces of the fluid spray generated by the wheels. It has been found that the separator plate 32 may be constructed of a flexible material since the spray generated by the adjacent wheels provides a force on either side thereof which is approximately equal, any resultant force being relatively small to substantially zero.

Figure 2:
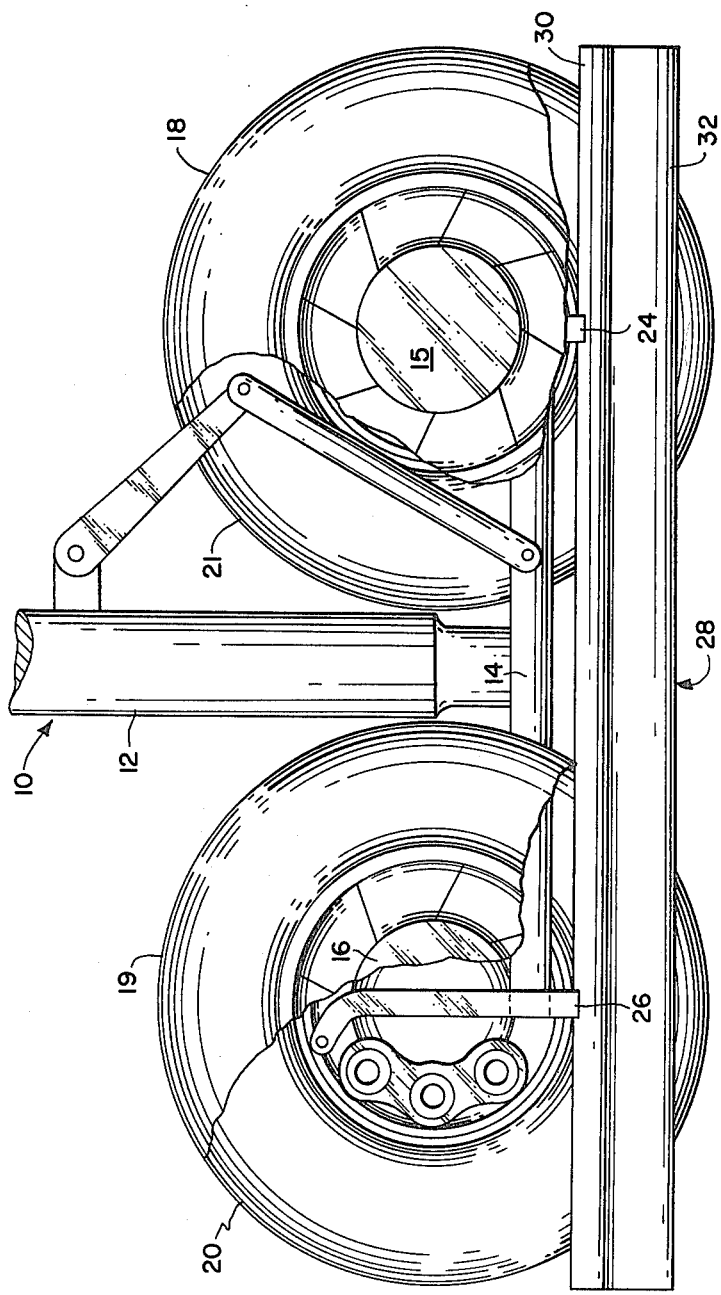
FIG. 2 is a side elevational view of the dual-tandem wheel bogie landing gear partially cut away to reveal the connection and location of the wheel spray drag alleviator.

As shown in FIGS. 1 through 3, deflector 28 is located below the axis of rotation of the wheels and in a position essentially parallel to wheel support beam 14. Deflector plate 28 is of sufficient width dimension such that it lies adjacent the wheels preventing the majority of the spray from bypassing the deflector plate. The spray pattern from the front wheels of a bogie gear system, when passing through slush, is similar to that observed as the wake of any object, for example a boat, moving through water. More specifically, the spray pattern is essentially divided into outwardly and inwardly directed portions each in an initial slight upward direction. The outwardly directed portion of this pattern presents no real problem, but portions of the inwardly directed spray tend to impinge on the rear wheels and results in substantial drag on a conventional bogie-type system. The novel deflector of the present invention also suppresses the so-called "rooster-tail" effect, i.e., the spray pattern normally displayed by converging portions of the inwardly directed spray as produced by dual wheels, which normally tends to move upward from the point of convergence to strike other parts of the aircraft and thereby contribute to drag during aircraft take-off in slush.

As apparent from FIG. 3 of the drawings, when utilizing the present invention, the inwardly directed spray will be prevented from reaching the rear wheels of the bogie system by deflector plate 30 and separating plate 32. Thus, separator plate 32 operates as a spray divider and prevents, for example, spray from the front wheels 18 and 21 from impinging on rear wheels 20 and 19, respectively, while also preventing spray from the tandem wheels 18 and 19 from impinging on the tandem wheels 20 and 21 and vice versa.

Although the deflector 28 is shown as an elongated member having a generally T-shaped cross section, it is to be understood that within the broadest aspects of the invention the deflector plate may take various sizes and configurations as deemed necessary to meet the requirements of a particular dual-tandem wheel bogie landing gear arrangement. For example, due to the increasing aircraft speed during roll through slush on take-off, the majority of the inwardly directed spray from the wheels will be channeled rearward of the gear system by divider 32 without ever reaching deflector plate 30. Thus, the deflector could take a generally V-shaped or U-shaped cross sectional configuration and be segmented rather than a continuous elongated member, as examples of possible modifications. Other means of supporting the deflector may be utilized, as well as the deflector assuming other positions and locations and still be considered within the scope of the invention. Although the deflector is designed particularly for use with a dual-tandem wheel bogie for aircraft, it would have application to other landing gear arrangements as well as to vehicles other than aircraft.

The graphical representation shown in FIG. 4 of the drawings clearly illustrates that use of the deflector greatly reduces the fluid drag. As shown herein, taking the conventional bogie assembly without the drag alleviator of the present invention as one hundred percent (as represented by the solid line), the maximum drag for the system is reduced to 55.9 percent when utilizing the herein described alleviator under like conditions (as represented by the lower dotted line). Thus, the entire bogie system is subjected to less drag when using the present alleviator than that experienced by the front wheels of this type system alone without the use of the present invention (note the center broken line on FIG. 4). This obvious advantageous feature of the present invention is particularly evident in the high speed range of sixty to one hundred knots, and higher, where take-off acceleration and performance is most critical for large aircraft.

Other advantages of the present invention include the simple and economical design of the deflector. That is, there are no moving parts and it is therefore extremely reliable. In addition, the deflector can be made of very lightweight metal, plastics, neoprene or like materials and therefore adds little penalty to the payload capability of the aircraft. Furthermore, due to the simplicity of design, the deflector can be seasonally added or removed from the aircraft as weather conditions so dictate.

As illustrated by the calcualted results shown in FIG. 5, the advantages of the present invention regarding passenger safety are readily apparent. For example, when employing the deflector as taught by the present invention the take-off distance required for a jet transport in two inches of slush is within the limits of most runways while, without this invention, take-off in this amount of slush requires an infinite length and would be impossible. This reduced take-off distance obviously serves to promote passenger safety, even when applying the present "one-half inch rule," and permits required military take-offs to be performed more safely.

While a preferred embodiment of this invention has been described, it will be understood that modifications and improvements may be made thereto. Such of these modifications and improvements as incorporate the principles of this invention are to be considered as included in the hereinafter appended claims unless these claims by their language expressly state otherwise.

What is claimed as new and desired to be secured by Letters Patent of the United States is:

1. A device for reducing fluid drag on a vehicle traveling on a slushy or rain-covered runway comprising: a vehicle; a wheel support beam associated with said vehicle; at least one wheel supported by the beam; and deflection means carried by said support beam and located adjacent said wheel in a position to deflect spray generated by said wheel away from said vehicle and from redirecting spray onto said wheel whereby fluid drag is reduced.

2. A device for reducing fluid drag on a vehicle traveling on a slushy or rain-covered runway comprising: a vehicle; a wheel support beam associated with said vehicle; at least one wheel supported by the beam; and deflection means carried by said vehicle and located adjacent said wheel to deflect spray generated thereby; said deflection means having a shape and being positioned substantially parallel to the surface over which the vehicle is running, below the axis of rotation of the wheel and in a manner to deflect spray generated by said wheel away from said vehicle and from redirecting spray onto said wheel.

3. A device for reducing fluid drag on an aircraft bogie landing gear traveling on a slushy or rain-covered runway comprising: A main strut adapted to be connected to an air vehicle body; a support beam carried by said strut; tandem wheels rotatably mounted on said support beam; deflection means having a shape and being located adjacent said tandem wheels in a position whereby fluid spray thrown by one of said wheels is prevented from impinging against the vehicle, another of said wheels; or being redirected onto said one of said wheels thereby alleviating fluid drag.

4. A device for reducing fluid drag on an aircraft bogie landing gear traveling on a slushy or rain-covered runway as in claim 3 wherein said deflection means is an elongated member extending adjacent at least two wheels of said tandem arrangement.

5. A device for reducing fluid drag on an aircraft bogie landing gear traveling on a slushy or rain-covered runway as in claim 3 wherein said deflection means is an elongated member extending adjacent at least two wheels of said tandem arrangement; and said elongated member having a section for directing fluid spray downwardly and another section for directing spray away from itself.

6. A device for reducing fluid drag on an aircraft bogie landing gear traveling on a slushy or rain-covered runway as in claim 3 wherein said tandem wheels include at least dual-tandem wheels; and said deflection means being an elongated member extending between said dual-tandem wheels.

7. A device for reducing fluid drag on an aircraft bogie landing gear traveling on a slushy or rain-covered runway as in claim 3 wherein said tandem wheels include at least dual-tandem wheels; said deflection means being located between said dual-tandem wheels; and said deflection means having a portion for directing fluid spray downwardly and another portion for directing fluid spray outwardly; said last mentioned portion also separating fluid generated by adjacent dual wheels.

8. A device for reducing fluid drag on an aircraft bogie landing gear traveling on a slushy or rain-covered runway comprising: a main strut adapted to be connected to an air vehicle body; a support beam carried by said strut; tandem wheels rotatably mounted on said support beam; deflection means located adjacent said tandem wheels; said tandem wheels include at least dual-tandem wheels, said deflection means being an elongated plate located between said dual-tandem wheels and extending forward of, in one direction, and beyond said wheels in the other direction; and said elongated member having a section directing fluid spray downwardly and a section directing spray outwardly; said section directing spray outwardly also separating spray from adjacent dual wheels.

9. A device for reducing fluid drag on an aircraft bogie gear traveling on a slushy or rain-covered runway comprising: a main strut adapted to be connected to an air vehicle body; a support beam carried by said strut; tandem wheels rotatably mounted on said support beam; deflection means located adjacent said tandem wheels; said tandem wheels include at least dual-tandem wheels, said deflection means being an elongated plate located between said dual-tandem wheels and extending forward of, in one direction, and beyond said wheels in the other direction; and said deflection means being positioned substantially parallel to the surface over which the vehicle is running and below the axis of rotation of the wheels.

10. A device for reducing fluid drag on an aircraft bogie gear traveling on a slushy or rain-covered runway comprising: a main strut adapted to be connected to an air vehicle body; a support beam carried by said strut; tandem wheels rotatably mounted on said support beam; deflection means located adjacent said tandem wheels; said tandem wheels include at least dual-tandem wheels, said deflection means being an elongated plate located between said tandem wheel pairs and extending forward of, in one direction and beyond said wheels in the other direction; said elongated member having a generally T-shaped cross section and being positioned substantially parallel to the surface over which the vehicle is running at a location below the axis of rotation of the wheels.

11. A device for reducing fluid drag on an aircraft bogie gear traveling on a slushy or rain-covered runway as in claim 7 wherein said last-mentioned portion is flexible.

References Cited by the Examiner
UNITED STATES PATENTS

| | | | |
|---|---|---|---|
| 2,038,234 | 4/36 | Olen | 280—154.5 |
| 2,080,161 | 5/37 | Berggren | 280—154.5 X |
| 2,572,342 | 10/51 | Huett | 244—100 |

FOREIGN PATENTS

| | | |
|---|---|---|
| 31,209 | 1/23 | Denmark. |
| 373,569 | 5/32 | Great Britain. |

MILTON BUCHLER, *Primary Examiner.*

ANDREW H. FARRELL, *Examiner.*